United States Patent
Hyung et al.

(10) Patent No.: US 9,097,935 B2
(45) Date of Patent: Aug. 4, 2015

(54) FIXING DEVICE OF DIFFUSING PLATE AND DISPLAY APPARATUS HAVING THE SAME

(71) Applicant: SAMSUNG ELECTRONICS CO., LTD., Suwon-si (KR)

(72) Inventors: Sin Wook Hyung, Busan (KR); Chang Hwa Baek, Suwon-si (KR); Dae Hee Lee, Hwaseong-si (KR); Kyoung Choul Jang, Suwon-si (KR); Hyeong Sik Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/175,636

(22) Filed: Feb. 7, 2014

(65) Prior Publication Data
US 2014/0226107 A1    Aug. 14, 2014

(30) Foreign Application Priority Data
Apr. 16, 2013  (KR) .......................... 10-2013-0041371

(51) Int. Cl.
G02F 1/1335    (2006.01)

(52) U.S. Cl.
CPC .... *G02F 1/133606* (2013.01); *G02F 1/133608* (2013.01); *G02F 2201/46* (2013.01)

(58) Field of Classification Search
CPC .................... G02F 1/133608; G02F 1/133606; G02F 1/133308; G02F 1/133615; G02F 1/133605; G02F 1/133504; G02F 1/1336; G02F 1/133524; G02F 2201/46; G02F 2201/465; G02F 2201/50; G02F 2001/133317; G02F 2001/133322; G02F 2001/133314; G02F 2001/133325; G02F 2001/13332; G02B 6/0088; G02B 6/0055; G02B 6/0031; G02B 6/0051; G02B 6/0053

USPC .......... 349/58, 64, 60, 62, 65; 362/97.1, 632, 362/97.2, 615, 362, 609, 612, 633, 634, 362/246, 341, 368, 382, 560, 581, 600, 362/807; 257/E33.072; 264/1.9; 348/E5.128, 836
See application file for complete search history.

(56) References Cited

U.S. PATENT DOCUMENTS 7,948,572 B2 *   5/2011   Bae et al. ........................ 349/58
8,310,616 B2 *  11/2012   Yun et al. ....................... 349/58

FOREIGN PATENT DOCUMENTS

| JP | 2004-235103 A | 8/2004 |
| JP | 2009-4202 A | 1/2009 |
| KR | 10-2006-0090070 A | 8/2006 |
| KR | 10-2008-0074337 A | 8/2008 |
| KR | 10-2013-0011499 A | 1/2013 |

OTHER PUBLICATIONS

Communication, dated Mar. 31, 2014, issued by the Korean Intellectual Property Office in counterpart Korean Application No. 10-2013-0041371.
International Search Report, dated May 7, 2014, issued by the International Searching Authority in counterpart International Application No. PCT/KR2014/001010.
Communication dated Jun. 30, 2014, issued by the European Patent Office in counterpart European Application No. 14154050.0.

* cited by examiner

*Primary Examiner* — Thoi Duong
(74) *Attorney, Agent, or Firm* — Sughrue Mion, PLLC

(57) ABSTRACT

A display apparatus includes a liquid crystal display panel configured to display an image, and a backlight unit configured to emit light to the liquid crystal display panel, wherein the backlight unit includes a bottom chassis comprising an accommodation space configured to accommodate a plurality of light sources, a middle mold provided on the bottom chassis, a diffusing plate provided on the middle mold, and a fixing member provided on an outer surface of the bottom chassis and configured to contact one side of the diffusing plate and prevent movement of the diffusing plate.

27 Claims, 8 Drawing Sheets

FIXING DEVICE OF DIFFUSING PLATE AND DISPLAY APPARATUS HAVING THE SAME

CROSS-REFERENCE TO RELATED APPLICATION(S)

This application claims priority from U.S. Provisional Patent Application No. 61/762,410, filed on Feb. 8, 2013 in the U.S. Patent and Trademark Office, and Korean Patent Application No. 10-2013-0041371, filed on Apr. 16, 2013 in the Korean Intellectual Property Office, the disclosure of which is incorporated herein by reference in their entirety.

BACKGROUND

1. Field

Apparatuses consistent with exemplary embodiments relate to a fixing device of a diffusing plate which immovably fixes the diffusing plate to a backlight unit and may prevent occurrence of a dark area due to a hole in the diffusing plate, and a display apparatus having the same.

2. Description of the Related Art

A display apparatus refers to an apparatus which visually displays information such as letters and figures. Modern display apparatuses include liquid crystal display devices and a frame to which the liquid crystal display device is mounted. When a voltage is applied to the liquid crystal cells of the liquid crystal display device, a specific arrangement of the liquid crystal cells changes. The liquid crystal display device visualizes the changes related to optical properties of liquid crystal cells, which emit light according to a molecular arrangement of the liquid crystal cells, such as birefringence, optical activity, dichroism and light scattering. The liquid crystal display device is a non-emissive type display apparatus that displays information using changes in the arrangement of the liquid crystal cells.

The liquid crystal display device uses a plurality of light sources in a backlight unit to display a clearer image, and also uses a diffusing plate to uniformly disperse light emitted from the light sources. In addition, a plurality of optical sheets such as a prism sheet may be installed in the liquid crystal display device to increase brightness of the diffusing plate.

The diffusing plate serves to disperse light in random directions. The diffusing plate may be opaque to allow light to be dispersed. In the related art, the diffusing plate has been fixed to the frame of a backlight assembly using a fixing member such as a screw requiring a hole on the diffusing plate for each screw.

SUMMARY

One or more exemplary embodiments provide a fixing device of a diffusing plate which may fix the diffusing plate using a fixing member in a stud shape to prevent movement of the diffusing plate and prevent development of dark areas on the diffusing plate by providing a reflective portion to a fixing member in order to provide best quality images, and a display apparatus having the same.

In accordance with an aspect of an exemplary embodiment, there is provided a display apparatus including a liquid crystal display panel configured to display an image, and a backlight unit configured to supply light to the liquid crystal display panel, wherein the backlight unit includes a bottom chassis including an accommodation space to accommodate a plurality of light sources, a middle mold provided on the bottom chassis, a diffusing plate provided on the middle mold, and a fixing member provided on an outer surface of the bottom chassis and configured to contact one side of the diffusing plate and prevent movement of the diffusing plate.

The fixing member may include a slope portion configured to contact the one side of the diffusing plate.

The slope portion may include provided with a reflective member configured to prevent production of a dark area on the diffusing plate.

The reflective member may include a reflective tape attached to the slope portion.

The reflective member may include a high reflectivity coating material coated on the slope portion.

The one side of the diffusing plate may include an inclined portion corresponding to the slope portion of the fixing member.

The fixing member may include a body and an extension portion extending from the body.

The slope portion may be provided on an upper surface of the extension portion and configured to contact the one side of the diffusing plate.

The body may be configured to contact the outer surface of the bottom chassis, wherein the display apparatus may further include a fastening member configured to fix the fixing member to the outer surface of the bottom chassis, and wherein the fastening member may be configured to penetrating the body, the middle mold, and the bottom chassis.

A side portion of the bottom chassis may include a bottom chassis hole, the middle mold may include a middle mold hole corresponding to the bottom chassis hole, and the body of the fixing member may include a fixing member hole aligned with the bottom chassis and middle mold holes, and wherein the fastening member is configured to penetrate the bottom chassis hole, the middle mold hole, and the fixing member hole.

The middle mold may include a first mold portion provided on a bottom surface of the bottom chassis, a second mold portion extending from the first mold portion and configured to contact an inner surface of the side portion of the bottom chassis, and a third mold portion extending from the second mold portion.

The third mold portion may extend in a direction parallel with the bottom surface of the bottom chassis.

The side portion of the bottom chassis may include a first plurality of holes, and the second mold portion may include a second plurality of holes corresponding to the first plurality of holes.

A fixing member hole of the fixing member may be provided at a position corresponding to one of the first plurality of holes of the bottom chassis and one of the second plurality of holes of the second mold portion.

An extension portion of the fixing member provided with the slope portion may be seated on the third mold portion.

In accordance with an aspect of another exemplary embodiment, there is provided a fixing device may include a body mounted to a bottom chassis configured to accommodate a plurality of light sources, and an extension portion extending from the body, wherein one side of the extension portion comprises a slope portion configured to contact one side of a diffusing plate provided at an upper portion of the bottom chassis, and wherein the fixing device may be configured to fix the diffusing plate to the bottom chassis and prevent movement of the diffusing plate.

The slope portion may include a reflective member including a high reflectivity material configured to prevent production of a dark area on the diffusing plate.

The extension portion may include a white extension portion.

The one side of the diffusing plate may include an inclined portion corresponding to the slope portion of the extension portion.

The fixing device may further include a fastening member wherein the fastening member is configured to penetrate and fix a middle mold provided with a surface parallel with a bottom surface of the diffusing plate to the bottom chassis.

In accordance with an aspect of yet another exemplary embodiment, there is provided a backlight unit of a display apparatus including: a plurality of light sources; a bottom chassis configured to accommodate the plurality of light sources; a middle mold provided on the bottom chassis; a diffusing plate provided on the middle mold; and a fixing member provided on an outer surface of the bottom chassis and configured to contact one side of the diffusing plate and prevent movement of the diffusing plate.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Figure 1A:
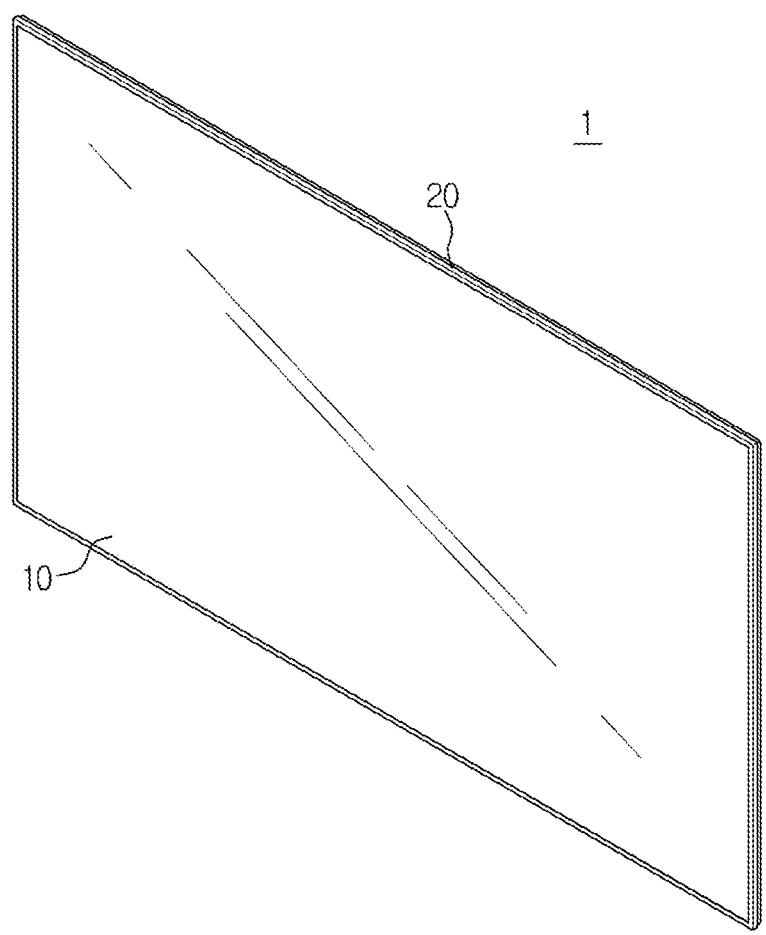
FIG. 1A is a perspective view showing a display apparatus according to an exemplary embodiment.

Reference will now be made in detail to the exemplary embodiments, examples of which are illustrated in the accompanying drawings, wherein like reference numerals refer to like elements throughout.

Hereinafter, a detailed description will be given of a fixing device of a diffusing plate and a display apparatus having the same, with reference to the drawings.

Figure 1B:
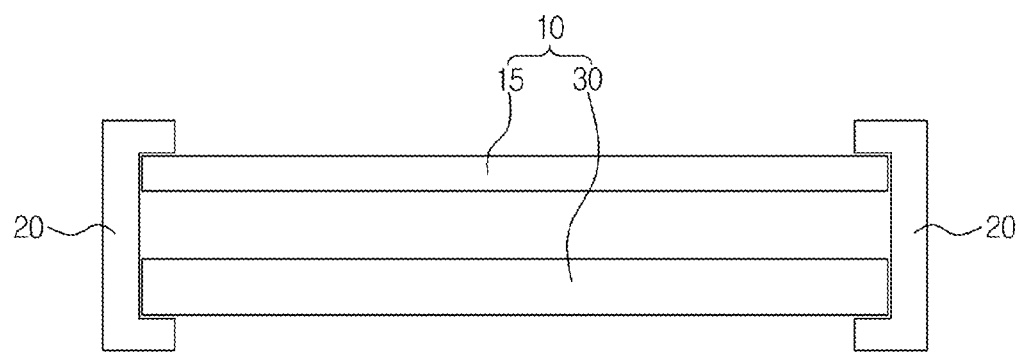
FIG. 1B is a schematic cross-sectional view of the display apparatus of FIG. 1A according to an exemplary embodiment.

FIG. 1A is a perspective view showing a display apparatus 1 according to an exemplary embodiment. FIG. 1B is a schematic cross-sectional view of the display apparatus 1 of FIG. 1A according to an exemplary embodiment.

With reference to FIGS. 1A and 1B, the display apparatus 1 according to the exemplary embodiment includes a liquid crystal display device 10 and a frame 20. The liquid crystal display device 10 is mounted to the frame 20. The liquid crystal display device 10 is a device such as a liquid crystal display (LCD) on which an image is displayed.

The liquid crystal display device 10 includes a liquid crystal display panel 15 and a backlight unit 30. The liquid crystal display panel 15 is a non-emissive device which does not produce light itself. The liquid crystal display panel 15 may display an image when light is supplied thereto from the backlight unit 30.

The liquid crystal display panel 15 may be formed by injecting a liquid crystal layer into a space between a thin-film-transistor (TFT) substrate and a color filter substrate. Polarizing films may be formed on the upper and lower portions of the liquid crystal display panel 15.

The backlight unit 30 may include a light emitting portion, a light guide plate, optical sheets, and a reflection sheet. The light emitting portion may include a light emitting diode (LED) or a cold-cathode fluorescent lamp (CCFL) to emit produced light onto the light guide plate. The light guide plate receives the light produced by the light emitting portion and uniformly distributes the light to the entire light emitting area of the backlight unit 30. The optical sheets may be attached onto the light guide plate and may selectively include a lens sheet, a diffusion sheet, and a protective sheet. The reflection sheet may be attached to the lower portion of the light guide plate to reflect light transmitted to the rear side of the light guide plate toward the liquid crystal display panel 15.

The frame 20 may accommodate and fix at least one of the liquid crystal display panel 15 and the backlight unit 30. The frame 20 may have a rectangular frame shape having four sidewalls. The inner circumferential surface of each of the sidewalls may be provided with at least one accommodation groove allowing the side surfaces of the liquid crystal display panel 15 and the backlight unit 30 to be inserted thereinto. Thereby, the frame 20 may be interconnected with the liquid crystal display panel 15 or the backlight unit 30.

The frame 20 may be fabricated through injection molding of a material including a silicone resin or a synthetic resin. The frame 20 may be formed to have various colors including white and black, or formed to be transparent. The frame 20 may be formed to be elastic. When an external shock is applied to the frame 20 with the liquid crystal display panel 15 and the backlight unit 30 accommodated in the frame 20, the shock is absorbed due to the elasticity of the frame 20. Accordingly, the liquid crystal display panel 15 and the backlight unit 30 may be protected.

Figure 2:
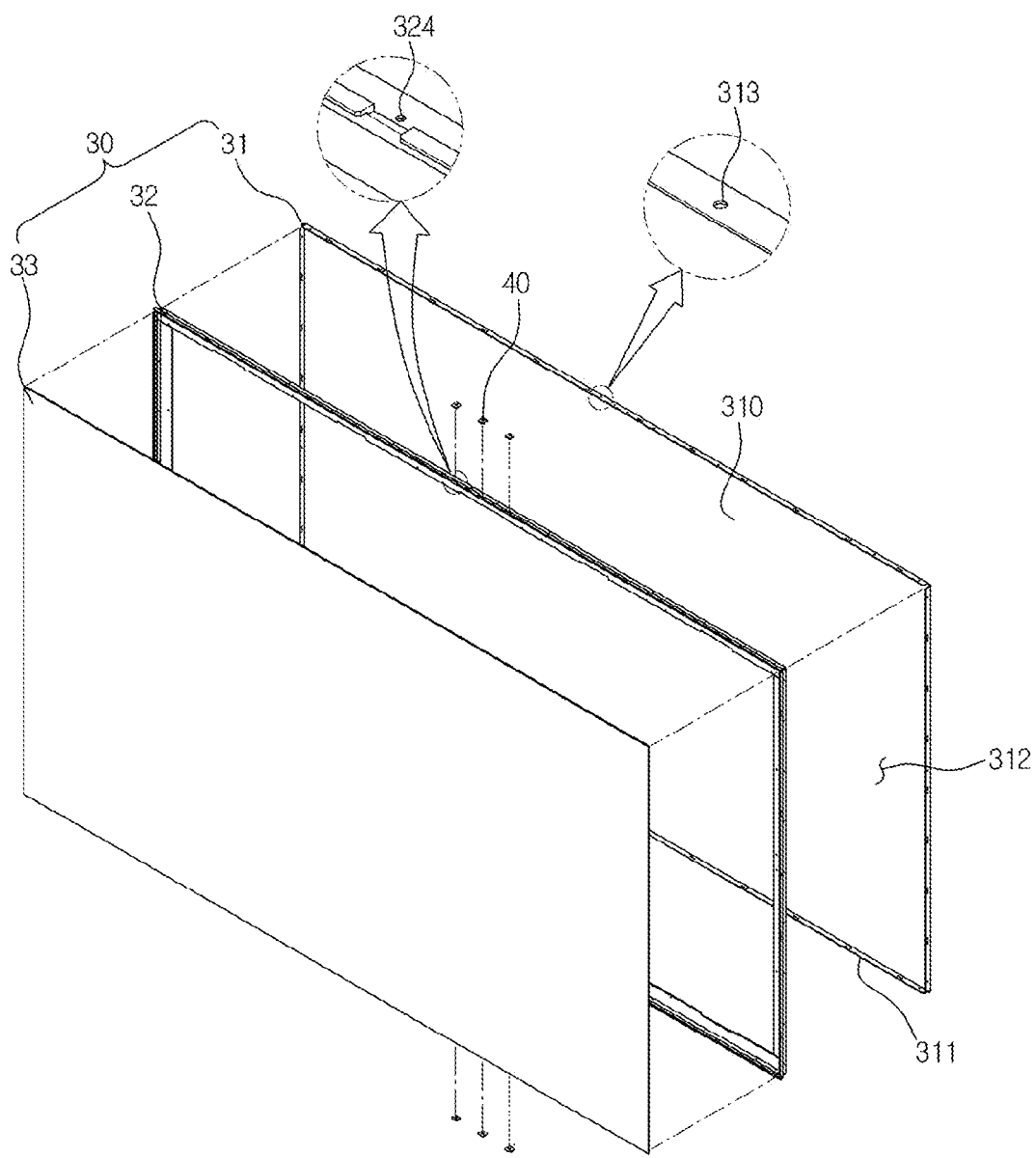
FIG. 2 is an exploded view showing a backlight unit according to an exemplary embodiment.
Figure 3:
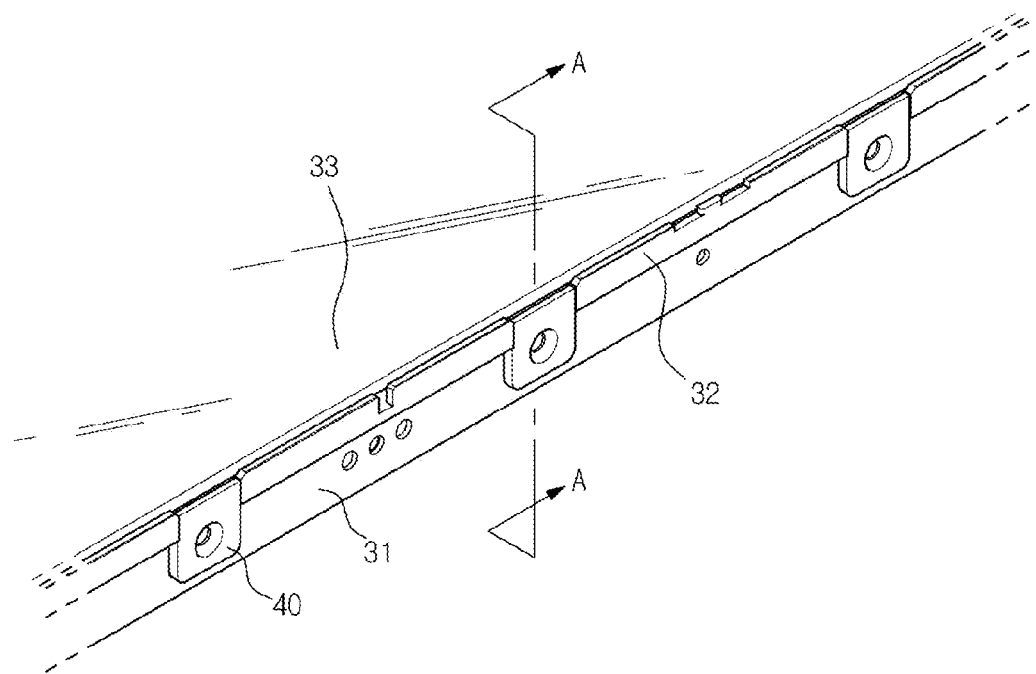
FIG. 3 is a view showing a fixing member mounted to the backlight unit according to an exemplary embodiment.

FIG. 2 is an exploded view showing a backlight unit 30 according to an exemplary embodiment, and FIG. 3 is a view showing a fixing member 40 mounted to the backlight unit according to an exemplary embodiment.

Referring to FIGS. 2 and 3, the backlight unit 30 includes a bottom chassis 31, a middle mold 32, a diffusing plate 33, and a plurality of light sources (not shown). The plurality of light sources may be a plurality of LEDs.

The bottom chassis 31 includes a bottom surface 310 and a side portion 311. The side portion 311 may extend at an angle from the bottom surface 310 to form an accommodation space 312. The bottom chassis 31 may be fabricated with a metal having high rigidity. The plurality of light sources (i.e. LEDs) may be accommodated in the accommodation space 312 of the bottom chassis 31. A plurality of holes 313 may be formed in the side portion 311 of the bottom chassis 31.

The middle mold 32 may be seated on the bottom chassis 31. The middle mold 32 includes a first mold portion 320, a second mold portion 321, and a third mold portion 323. The first mold portion 320 is seated on the bottom surface 310 of the bottom chassis 31. The second mold portion 321 extends from the first mold 320 at an angle, contacting the inner surface of the side portion 311 of the bottom chassis 31. The third mold portion 323 extends from the second mold 321 at an angle and the diffusing plate 33 is seated on a top surface of the third mold portion 323. The third mold portion 323 may be arranged to extend in a direction parallel with the bottom surface 310 of the bottom chassis 31.

The second mold portion 321 may be provided with holes 324 corresponding to the plurality of holes 313 formed in the side portion 311 of the bottom chassis 31. A fixing member 40, which will be described later in more detail, may be coupled to the bottom chassis 31 and the middle mold 32 by a fastening member 50 (FIG. 6) penetrating through the hole 313 formed in the side portion 311 of the bottom chassis 31, the corresponding hole 324 formed in the second mold 321 of the middle mold 32 and the fixing member 40.

The diffusing plate 33 may be seated on the third mold portion 323 of the middle mold 32. The diffusing plate 33 may be seated on the bottom chassis 31 and the middle mold 32 by the fixing member 40.

The optical sheets and the liquid crystal display panel 15 may be seated on the diffusing plate 33. Light emitted from the light sources may be uniformly diffused by the diffusing plate 33, and the luminance thereof may be enhanced by the optical sheets. The liquid crystal display panel 15 may display an image by receiving light transmitted from the diffusing plate 33 and the optical sheets.

Meanwhile, as the light sources, lamps such as cold-cathode fluorescent lamps (CCFLs) and external electrode fluorescent lamps (EEFLs) may be used in addition to LEDs. The types of the light sources are not limited to those mentioned above.

Figure 4:
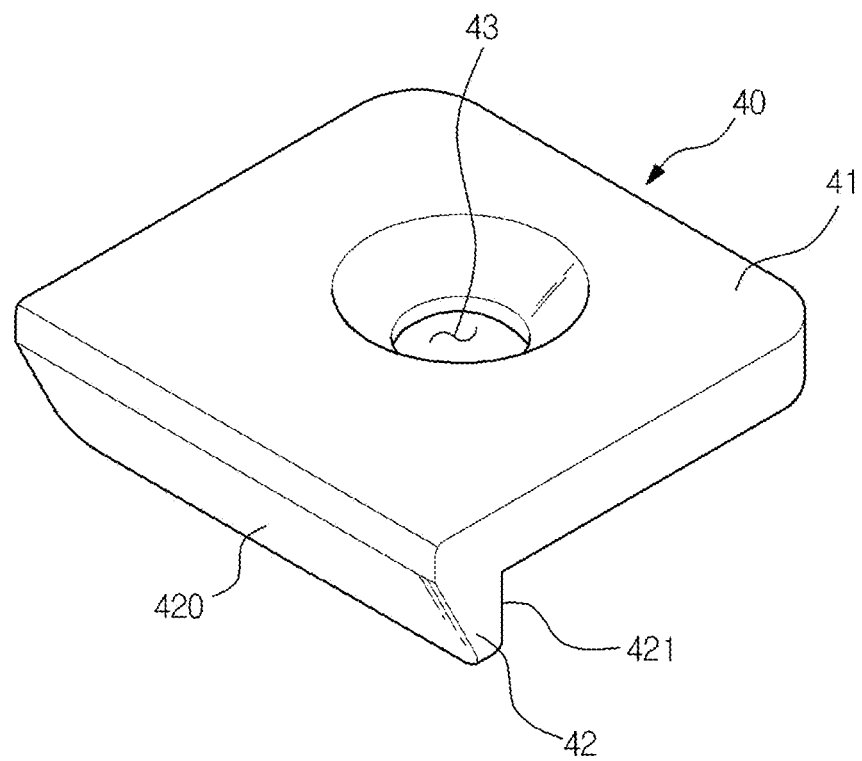
FIG. 4 is a perspective view showing a fixing member according to an exemplary embodiment.

FIG. 4 is a perspective view showing a fixing member 40 according to an exemplary embodiment.

Referring to FIG. 4, the fixing member 40 includes a body 41 and an extension portion 42. The extension portion 42 extends from the body 41 at an angle.

The body 41 may contact the outer surface of the side portion 311 of the bottom chassis 31. A hole 43 may be formed in the body 41. The hole 43 formed in the body 41 may be arranged to be aligned with the hole 313 in the bottom chassis 31 and the hole 324 in the middle mold 32. The fixing member 40 may be coupled to the backlight unit 30 by a fastening member 50 (FIG. 6) penetrating the hole 43 formed in the body 41 of the fixing member 40, the hole 324 in the middle mold 32, and the hole 313 formed in the bottom chassis 31.

The extension portion 42 may be formed by bending and extending from the body 41. A bottom surface 421 of the extension portion 42 may be seated on the third mold 323 of the middle mold 32. An upper surface of the extension portion 42 is formed to be inclined. The inclined upper surface of the extension portion 42 may be referred to as a slope 420. The slope 420 may contact and closely press a surface of the diffusing plate 33 such that the diffusing plate 33 is fixed and does not move.

Figure 5:
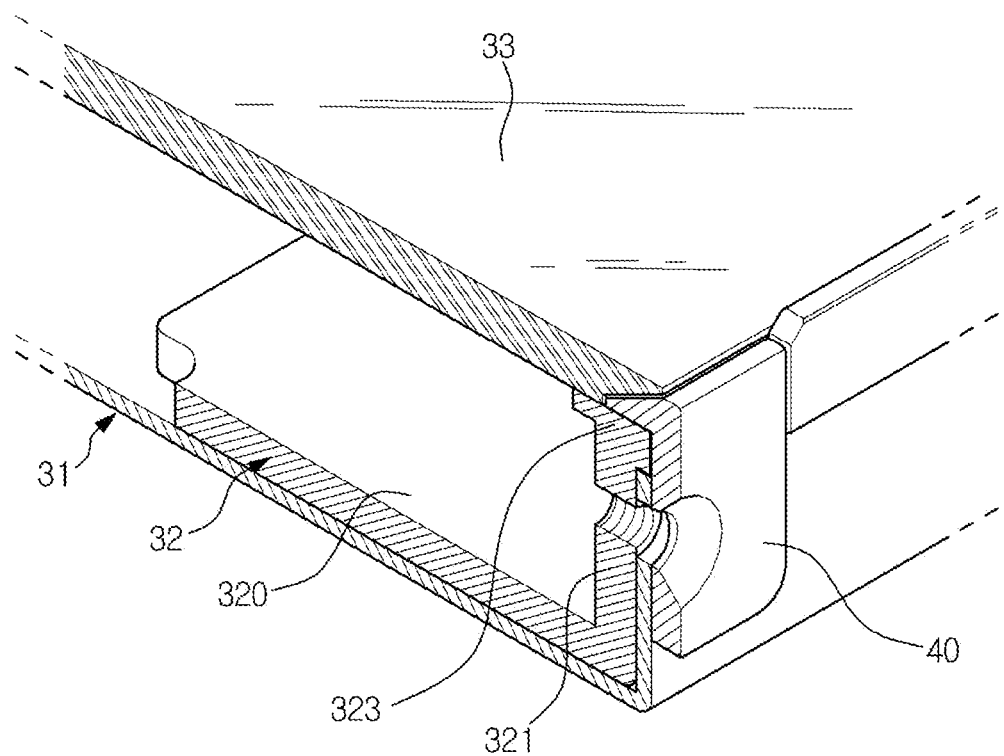
FIG. 5 is a partial cutaway view showing a diffusing plate and the fixing member mounted to a backlight unit according to an exemplary embodiment.
Figure 6:
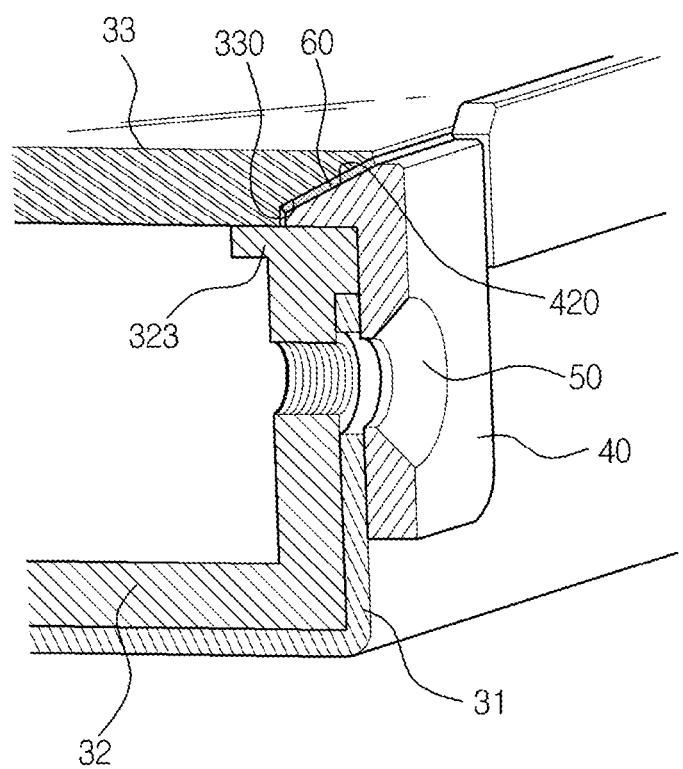
FIGS. 6 and 7 are views showing the fixing member mounted to the backlight unit according to an exemplary embodiment.
Figure 7:
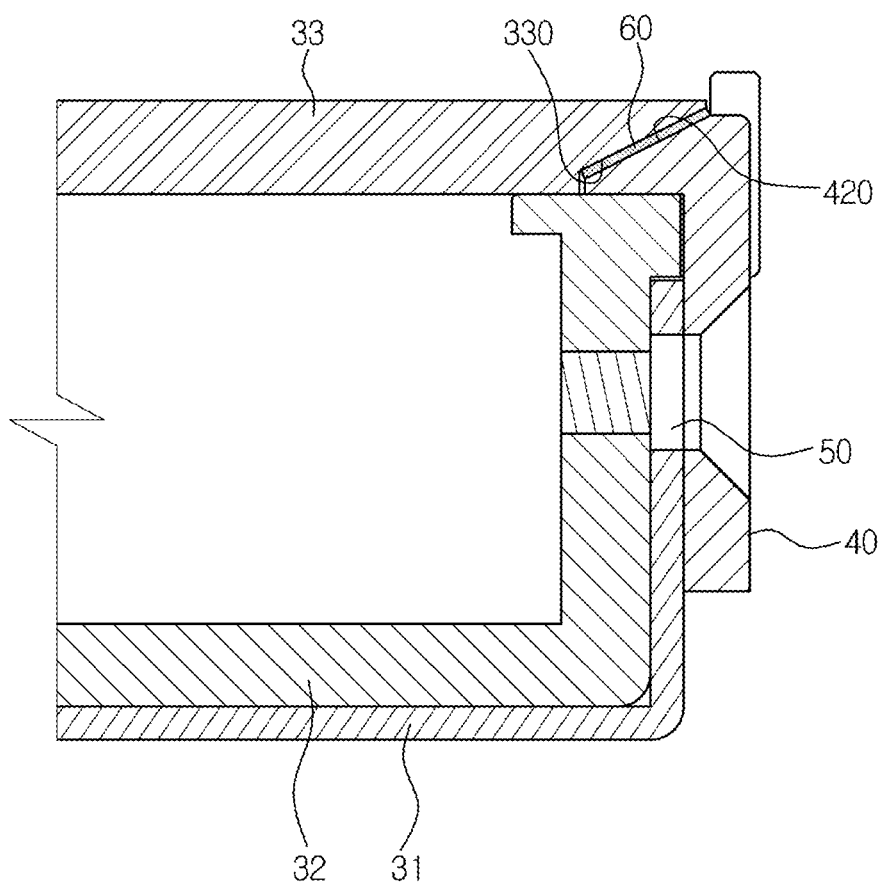

FIG. 5 is a partial cutaway view showing a diffusing plate 33 and a fixing member 40 mounted to a backlight unit 30 according to an exemplary embodiment, and FIGS. 6 and 7 are views showing a fixing member 40 mounted to a backlight unit 30 according to an exemplary embodiment.

Referring to FIGS. 5 to 7, the middle mold 32 of the illustrated embodiment may be seated on the bottom surface 310 of the bottom chassis 31, and the fixing member 40 may be arranged to contact the outer surface of the side portion 311 of the bottom chassis 31. Herein, the hole 43 formed in the fixing member 40, the hole 313 formed in the bottom chassis 31, and the hole 324 formed in the middle mold 32 may be arranged to be aligned with one another. The fixing member 40, the bottom chassis 31 and the middle mold 32 may be joined together by a fastening member 50 penetrating all of the hole 43 formed in the fixing member 40, the hole 313 formed in the bottom chassis 31, and the hole 324.

The diffusing plate 33 may be seated on the third mold portion 323 of the middle mold 32. One side of the diffusing plate 33 may be formed to be inclined. This inclined side may be referred to as a slope 330 of the diffusing plate 33. The slope 330 of the diffusing plate 33 may contact the slope 420 of the fixing member 40. As the slope 330 of the diffusing plate 33 and the slope 420 of the fixing member 40 contact and closely press each other, movement of the diffusing plate 33 may be prevented.

The slope 420 of the fixing member 40 may be provided with a reflective member 60. The reflective member 60 may be formed by attaching a reflective tape onto the slope 420 of the fixing member 40 or by coating the slope 420 of the fixing member 40 with a material having a high reflectivity. For example, a tape containing a white dye may be attached to the slope 420 of the fixing member 40, or a coating material containing the white dye may be applied onto the slope 420. The fixing member 40 may be colored white. Alternatively, only the extension portion 42 of the fixing member 40 may be white. The reflective member 60 may be provided to the slope 330 of the diffusing plate 33 instead of provided on the slope 420 of the fixing member 40.

By forming the reflective member 60 on the slope 420 of the fixing member 40, a dark area may be prevented from being formed on the diffusing plate 33. To form the slope 330 on the diffusing plate 33, one side of the diffusing plate 33 may be machined to be inclined. The side of the diffusing plate 33 at which the slope 330 is formed may be covered by the fixing member 40, and thereby a dark area may be prevented.

In the illustrated exemplary embodiment, the reflective portion 60 is provided to the fixing member 40, thereby supporting diffusion of light by the diffusing plate 33 positioned at the upper surface of the fixing member 40.

In the related art, the diffusing plate is fixed by a fixing device such as a screw requiring a hole on the diffusing plate for each screw to prevent movement of the diffusing plate. However, light may not be sufficiently supplied to a specific portion of the diffusing plate corresponding to the position of the fixing device, and accordingly, a dark area which is darker than the surrounding area of the fixing device may be produced.

In the illustrated exemplary embodiment, by providing the fixing member 40 with a reflective color having a high reflectivity, or with a reflective member 60 at the slope 420 of the fixing member 40 corresponding to the slope 330 of the diffusing plate 33, the loss of light transmitted through the portion corresponding to the slope 330 of diffusing plate 33 may be compensated.

Thereby, the diffusing plate 33 may be fixed by the fixing member 40 such that the movement of the diffusing plate 33 is prevented, and uniform image quality may be ensured throughout the liquid crystal display device by preventing production of a dark area around the fixing member 40. Thereby, a display apparatus producing a high quality image may be provided.

According to the illustrated exemplary embodiment, movement of the diffusing plate 33 may be prevented by the fixing member 40. In addition, movement of the diffusing plate 33 may be prevented by providing the reflective member 60 to the fixing member 40. Accordingly, the fixing member 40 may be referred to as a fixing device of the diffusing plate 33. Further, by forming the reflective member 60 on the fixing member 40 and providing the slope 330 to the diffusing plate 30, production of a dark area may be prevented over the entire surface of the diffusing plate 30.

As is apparent from the above description, according to an exemplary embodiment, a diffusing plate 33 is fixed to a backlight unit 30 by a fixing member 40, and thereby movement of the diffusing plate 33 may be prevented. In addition, as a reflective surface is provided to the fixing member 40, production of a dark area on the diffusing plate 33 may be prevented and thus a display apparatus realizing ideal image quality may be provided.

While exemplary embodiments have been shown and described above, it would be appreciated by those skilled in the art that various changes may be made therein without departing from the principles and spirit of the present inventive concept, as defined by the following claims.

What is claimed is:

1. A display apparatus comprising:
   a liquid crystal display panel configured to display an image; and
   a backlight unit configured to supply light to the liquid crystal display panel,
   wherein the backlight unit comprises:
   a bottom chassis comprising an accommodation space configured to accommodate a plurality of light sources;
   a middle mold provided on the bottom chassis;
   a diffusing plate provided on the middle mold; and
   a fixing member provided on an outer surface of the bottom chassis, and configured to contact only intermittent portions along a circumference of the diffusing plate and prevent movement of the diffusing plate.

2. The display apparatus according to claim 1, wherein the fixing member comprises a slope portion configured to contact the intermittent portions of the diffusing plate.

3. The display apparatus according to claim 2, wherein the slope portion comprises a reflective member configured to prevent production of a dark area on the diffusing plate.

4. The display apparatus according to claim 3, wherein the reflective member comprises a reflective tape attached to the slope portion.

5. The display apparatus according to claim 3, wherein the reflective member comprises a high reflective coating material coated on the slope portion.

6. The display apparatus according to claim 2, wherein the intermittent portions of the diffusing plate comprises an inclined portion corresponding to the slope portion of the fixing member.

7. The display apparatus according to claim 2, wherein the fixing member comprises:
   a body; and
   an extension portion extending from the body.

8. The display apparatus according to claim 7, wherein the slope portion is provided on an upper surface of the extension portion and configured to contact the intermittent portions of the diffusing plate.

9. The display apparatus according to claim 7, wherein the body is configured to contact the outer surface of the bottom chassis,
   wherein the display apparatus further comprises a fastening member configured to fix the fixing member to the outer surface of the bottom chassis, and
   wherein the fastening member is configured to penetrate the body, the middle mold, and the bottom chassis.

10. The display apparatus according to claim 9, wherein a side portion of the bottom chassis comprises a bottom chassis hole, the middle mold comprises a middle mold hole corresponding to the bottom chassis hole, and the body of the fixing member comprises a fixing member hole aligned with the bottom chassis hole and the middle mold hole, and
    wherein the fastening member is configured to penetrate the bottom chassis hole, the middle mold hole, and the fixing member hole.

11. The display apparatus according to claim 2, wherein the middle mold comprises:
    a first mold portion provided on a bottom surface of the bottom chassis;
    a second mold portion extending from the first mold portion and configured to contact an inner surface of the side portion of the bottom chassis; and
    a third mold portion extending from the second mold portion.

12. The display apparatus according to claim 11, wherein the third mold portion extends in a direction parallel with the bottom surface of the bottom chassis.

13. The display apparatus according to claim 11, wherein the side portion of the bottom chassis comprises a first plurality of holes, and the second mold portion comprises a second plurality of holes corresponding to the first plurality of holes.

14. The display apparatus according to claim 13, wherein a fixing member hole of the fixing member is provided at a position corresponding to one of the first plurality of holes of the bottom chassis and one of the second plurality of holes of the second mold portion.

15. The display apparatus according to claim 14, wherein an extension portion of the fixing member provided with the slope portion is seated on the third mold portion.

16. A fixing device comprising:
    a body mounted to a bottom chassis configured to accommodate a plurality of light sources; and
    an extension portion extending from the body at an angle,
    wherein one side of the extension portion comprises a sloped surface extending toward a lower portion of the bottom chassis, one side of a diffusing plate resting on the sloped surface for support at an upper portion of the bottom chassis, and
    wherein the fixing device is configured to fix the diffusing plate to the bottom chassis and prevent movement of the diffusing plate.

17. The fixing device according to claim 16, wherein the sloped surface comprises a reflective member comprising a high reflectivity material configured to prevent production of a dark area on the diffusing plate.

18. The fixing device according to claim 16, wherein the extension portion comprises a white extension portion.

19. The fixing device according to claim 16, wherein the one side of the diffusing plate comprises an inclined portion corresponding to the sloped surface of the extension portion.

20. The fixing device according to claim 16, further comprising a fastening member,
    wherein the fastening member is configured to penetrate and fix a middle mold provided with a surface parallel with a bottom surface of the diffusing plate to the bottom chassis.

21. A backlight unit of a display apparatus comprising:
    a plurality of light sources;
    a bottom chassis configured to accommodate the plurality of light sources;
    a middle mold provided on the bottom chassis;
    a diffusing plate provided on the middle mold; and
    a fixing member provided on an outer surface of the bottom chassis and configured to contact only intermittent portions along a circumference of the diffusing plate and prevent movement of the diffusing plate.

22. A backlight unit of a display apparatus comprising:
    a plurality of light sources;
    a bottom chassis configured to accommodate the plurality of light sources;
    a middle mold provided on the bottom chassis;

a diffusing plate provided on the middle mold; and a fixing member provided on an outer surface of the bottom chassis and configured to contact only a partial part of the diffusing plate and prevent movement of the diffusing plate, wherein the fixing member comprises a slope portion configured to contact the partial part of the diffusing plate.

23. The backlight unit according to claim 22, wherein the slope portion comprises a reflective member configured to prevent production of a dark area on the diffusing plate.

24. The backlight unit according to claim 23, wherein the reflective member comprises a reflective tape attached to the slope portion.

25. The backlight unit according to claim 23, wherein the reflective member comprises a high reflective coating material coated on the slope portion.

26. The backlight unit according to claim 22, wherein the partial part of the diffusing plate comprises an inclined portion corresponding to the slope portion of the fixing member.

27. The backlight unit according to claim 22, wherein the slope portion is provided on an extension portion of the fixing member and configured to contact the partial part of the diffusing plate.

\* \* \* \* \*